J. N. JOHNSON.
REPEATING CAMERA.
APPLICATION FILED FEB. 7, 1914.
1,166,763. Patented Jan. 4, 1916.
2 SHEETS—SHEET 1.
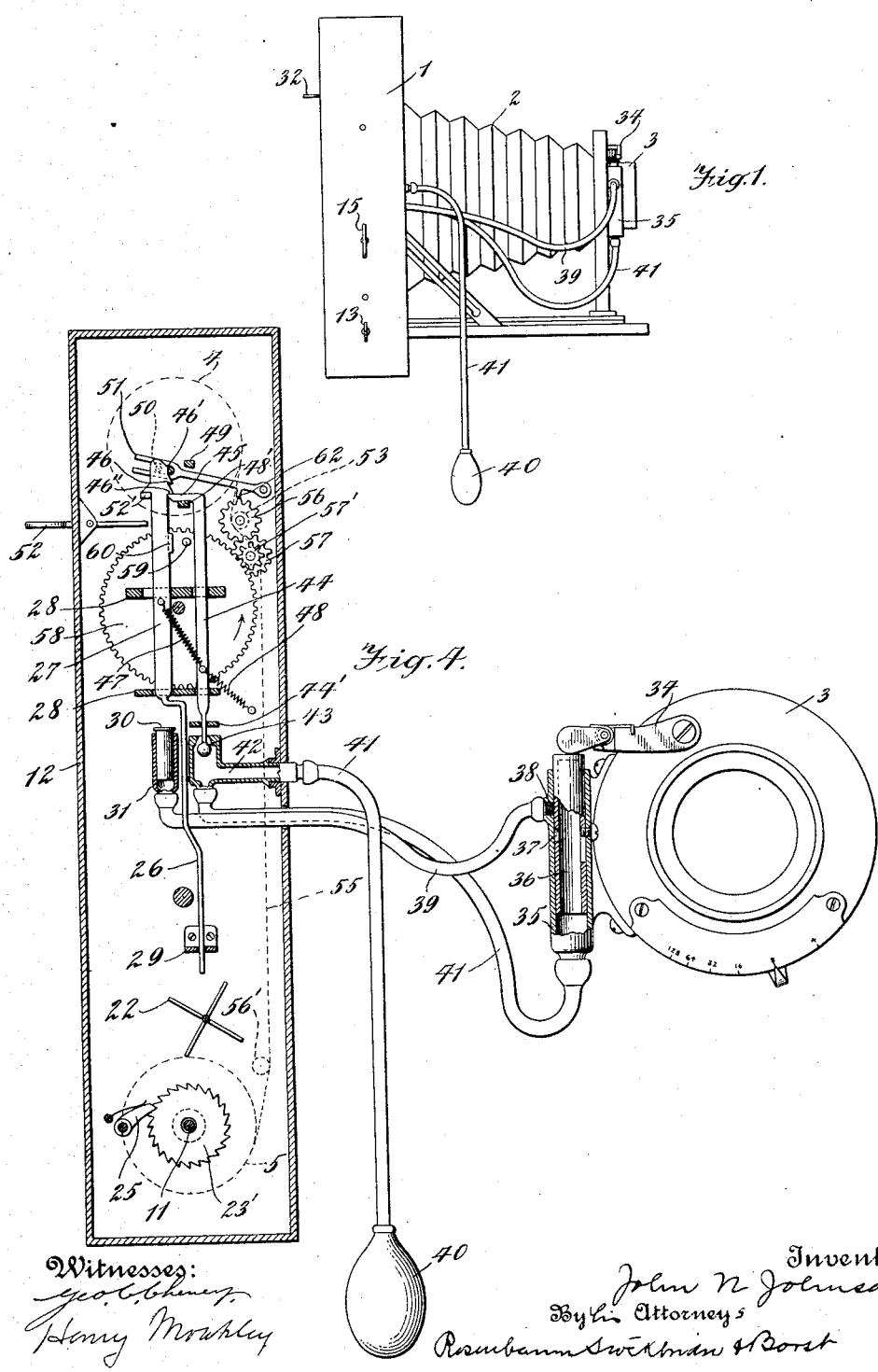

J. N. JOHNSON.
REPEATING CAMERA.
APPLICATION FILED FEB. 7, 1914.
1,166,763.
Patented Jan. 4, 1916.
2 SHEETS—SHEET 2.
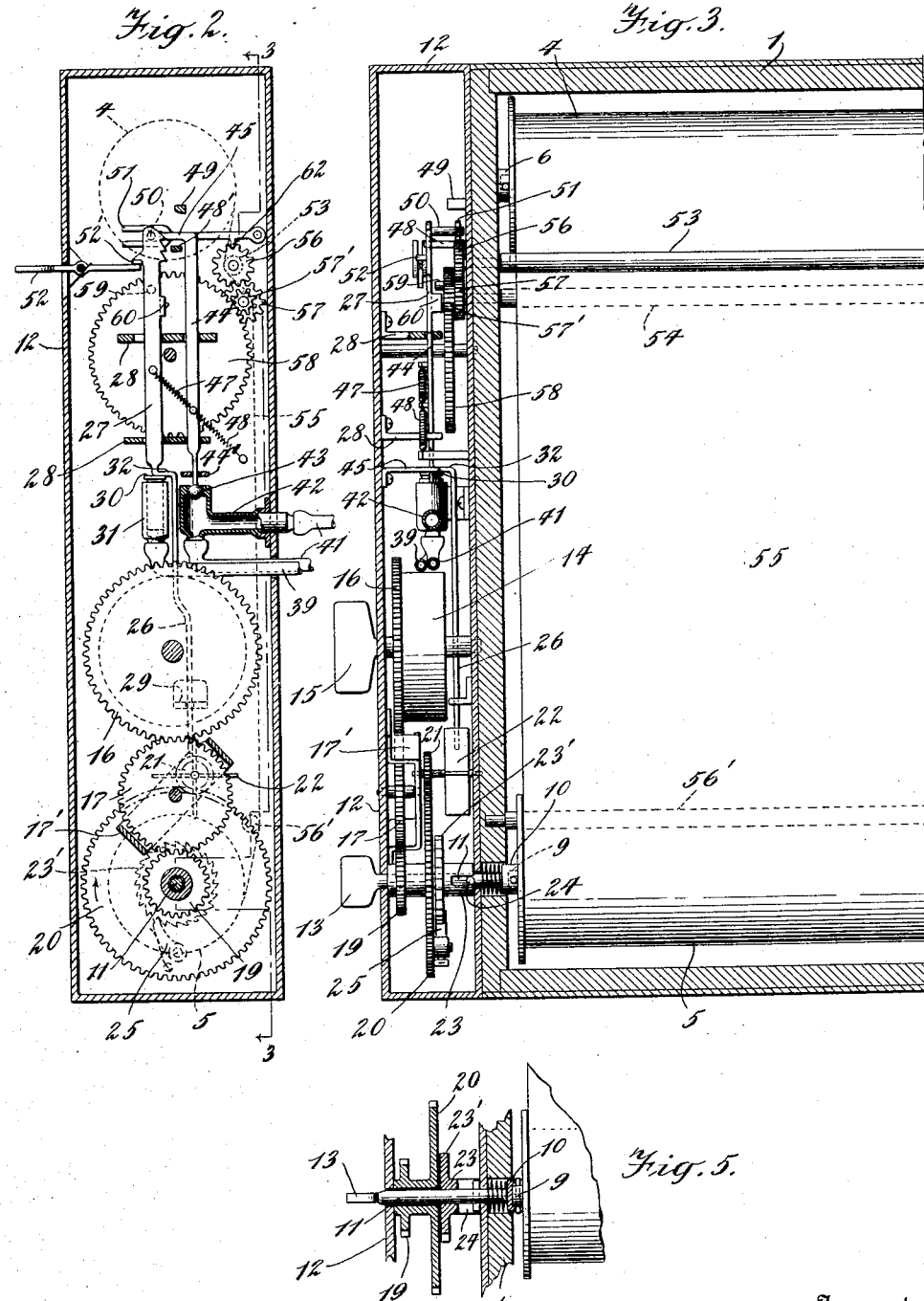
Witnesses:
Inventor
John N. Johnson
By his Attorneys

UNITED STATES PATENT OFFICE.

JOHN N. JOHNSON, OF ALBUQUERQUE, NEW MEXICO.

REPEATING CAMERA.

1,166,763.   Specification of Letters Patent.   Patented Jan. 4, 1916.

Application filed February 7, 1914.   Serial No. 817,132.

*To all whom it may concern:*

Be it known that I, JOHN N. JOHNSON, a citizen of the United States, residing at Albuquerque, in the county of Bernalillo and State of New Mexico, have invented certain new and useful Improvements in Repeating Cameras, of which the following is a full, clear, and exact description.

This invention relates to cameras and more specifically to the type of cameras commonly known as "repeating" or "magazine" cameras, which are provided with a motor operated mechanism for automatically shifting the film after each actuation of the shutter, so that a number of snap-shots may be taken in rapid succession.

In my former Patent No. 1,083,743, granted January 6th, 1914, I have disclosed a camera of this general type requiring a special form of film having notches at spaced intervals in one of its edges with which a stop, controlling the motor operated mechanism, co-acts. The shutter of the camera and this stop are successively actuated by two pneumatically operated pistons, the stop being raised from its engagement with a notch in the film permitting the motor to automatically shift the film until a second notch reaches the stop. The stop is then forced into engagement with this notch and stops the motor.

The general object of the present invention is to eliminate the necessity for a special form of film adapting the camera for use with the ordinary form of film rolls now on the market.

I am aware that "magazine" cameras operating on this general principle are known, but the present invention has for its object to generally improve the construction and arrangement of the mechanism which controls the shifting of the film, so that the same may be operated by a fluid pressure operated piston whereby a more accurate, direct and positive running mechanism is produced.

Another object of my invention is to positively prevent the double exposure of a portion of the film, which object I attain by interposing in the duct which supplies fluid pressure to the piston which operates the shutter, a normally closed valve which is maintained open during the operation of the motor and also if the motor does not operate upon the actuation of the shutter.

With these and other objects in view, my invention consists of the particular arrangements and constructions, the particular features of which will be brought out to advantage in the detail description and particularly pointed out in the claims appended hereto.

In the accompanying drawing, I have illustrated one embodiment of my invention associated with the ordinary form of camera, but it is to be understood that the camera shown herein is adapted for use with suspension devices such as I have shown in my former patent above referred to, whereby the camera while held in one hand may be actuated to take a series of snap shots in rapid succession.

In the drawings: Figure 1 is a side elevation of a repeating camera constructed in accordance with and embodying the principles of my invention; Fig. 2 is an enlarged side elevation of Fig. 1, the side of the casing being removed to clearly show the operating mechanism, the bellows and shutter of the camera being omitted; Fig. 3 is a section taken on the line 3—3 of Fig. 2; Fig. 4 is a view similar to Fig. 2, the parts being shown in the position they assume while the film is being advanced, the shutter and associated mechanism being shown disconnected from the camera; and Fig. 5 is a detail of the mechanism for manually winding the receiving spool.

Referring first to Fig. 1 in which I have shown an ordinary form of camera, 1 designates broadly the box of the camera, 2 the bellows and 3 the usual shutter mechanism, the camera being of the folding type, but it is to be understood that the invention is equally applicable to all forms of camera. Mounted within this box are the usual spools 4 and 5, the spool 4 being the supply spool, which carries the fresh roll of film and the spool 5 being the usual receiving spool upon which the exposed film is wound. The spool 4 is provided with the usual trunnions, one of which is mounted in a fixed bearing (not shown), while the other trunnion is rotatably supported in the yieldingly mounted bearing 6, which permits the empty spool to be displaced longitudinally of its axis, removed and replaced by a spool carrying the fresh roll of film, the back of the box 1 being removable to give access to the spools. The receiving spool 5 is similarly mounted and a trunnion 9 carried by the spool is provided with a pin which rotatably connects the spool to a yielding clutch head 10. Connected to the head 10 is a spindle or shaft 11, which extends to the exterior of the box and through a chamber formed by a casing 12 to the exterior of the same where it is provided with a key 13 for manually rotating the spool 5. The casing 12 extends the entire length of the box and provides the chamber which incloses the working mechanism for shifting the film.

The motor operated mechanism for automatically rotating the spool 5 to wind the film thereon comprises a spring barrel 14 which may be wound by means of a key 15, extending to the exterior of the casing. Mounted on the shaft of the spring barrel is a gear 16, which meshes with an intermediate gear 17 mounted on a shaft, one end of which is supported in the casing and the other end is supported in a bench 17' secured to the casing. The gear 17 meshes with a pinion 19 carried by a sleeve loosely mounted on the shaft 11, which sleeve has attached thereto a gear 20 which meshes with a small pinion 21, mounted on a shaft which carries the fan or vane 22. This fan or vane acts as a retarding means to control the speed of the pinion 20, hence the speed of gear 16 and also forms the member which may be released or held against rotation to control the rotation of the spool 5 as will be hereinafter referred to. Mounted on the shaft 11 is a second sleeve 23 which is connected to the shaft 11 by a pin and slot connection 24 so as to constrain the shaft to rotate therewith. The sleeve 23 carries a ratchet wheel 23' which is engaged by a pawl 25 carried by the gear 20. It will therefore be evident that when the fan 22 is released the rotation of the gear 20, which receives its motion from the spring barrel 14, will be transmitted to the spool 5 through the pawl and ratchet connection described. When, however, it is desired to manually rotate the spool 5 to wind up the film, the key 13 may be turned independently of the gear wheel 20, the pawl 25 slipping over the teeth of the ratchet wheel 23', the direction of rotation being indicated by the arrow shown in Fig. 2.

The vane or fan 22 is controlled by a rod 26, which is offset from and forms an extension of a stop rod 27 slidably supported in guides 28. The rod 27 as is shown in Fig. 2, is preferably flat to prevent rotative movement of the same and the openings in the guides 28 are made sufficiently large to permit lateral movement of the rod for a purpose which will be hereinafter brought out in the operation of the device. The end of the extension rod 26 adjacent the vane or fan 22 is slidably supported in a bracket 29.

Referring now to the mechanism for moving the stop lever 27 and hence the rod 26 out of path of the fan 22, this mechanism comprises a hollow piston 30 mounted in a cylinder 31, the piston 30 abutting against an offset portion 32 of the rod 26 in the normal position of the parts as shown in Fig. 2. The piston 30 is pneumatically operated in a manner similar to that shown in my former patent heretofore referred to, and referring to Fig. 4, the connections whereby this is attained will be briefly described. The shutter 3 is provided with the usual shutter operating lever 34 with which is associated a hollow cylinder 35 in which slides a hollow piston 36 closed at its upper end and provided with a port 37 which is adapted to register with the opening in a nipple 38 to which is connected a flexible tube 39 which conducts the fluid to the piston 31. The fluid pressure is supplied to the piston 35 by means of a bulb 40 connected to a flexible tube 41, the construction thus far described being similar in my former patent and is adapted to move the piston 30 only after the port 37 is in register with the nipple 38; that is, after the piston 36 has moved the lever 34 to operate the shutter. Interposed in the flexible tube 41 and preferably inclosed within the casing 12 is a valve casing which is designated broadly as 42, which forms a seat for a ball valve 43 which in its open position is adapted to release the fluid pressure in the tube 41 to prevent the actuation of the shutter by means of the piston 36. This valve forms one of the important features of the present invention and will hereinafter be referred to.

The stem of the ball valve 43 is connected to the valve rod 44 which is slidably mounted in the guides 28 and a third guide 44' which supports the stem of the valve. The openings in the guides 28 which support the lever 44 are sufficiently large to permit lateral movement of the same which will be referred to in the operation of the device. This valve rod similar to the stop rod 27 is flat to prevent it from rotating. The upper end of the rod 44 is bent at right angles to the main portion and provides a latch 45 which is adapted to co-act with teeth 46 carried on the upper end of the stop rod 27. The rods 27 and 44 are connected together by means of a spring 47 which is diagonally arranged as is shown in Figs. 2 and 4. Connected to the rod 44 is a second spring 48 which may be integral with the spring 47 and which is also diagonally arranged, so as to exert its tension to pull the rods 44 and 27 downwardly when they are locked together. By virtue of the particular arrangement of the spring 47, this spring pulls the rods 27 and 44 toward each other and also pulls the stop rod 27 downwardly and the valve rod 44 upwardly; that is, the stop rod 27 is normally biased to a position where its offset portion 32 will rest on the piston 30 and the valve rod 44 is normally biased to a position in which the ball valve 43 is in closed position, the tension of the spring 47 being sufficiently stronger than the tension of the spring 48 to permit the lever 44 to be moved upward to close the valve against the tension of spring 48. If, however, the piston 30 is moved upwardly from its normal position as shown in Fig. 2, it will move the stop rod 27 upwardly which will then be locked in its upper position by the engagement of one of the teeth 46 with the latch 45. When the rods are locked together, the tension of the spring 47 is negligible as it merely holds the two rods in locked engagement with each other and the spring 48 will therefore move both rods downwardly to open the valve 43, a stop 48' being provided to limit the downward movement of the two rods which stop engages with the under side of the latch 45. The upward movement of the stop rod 27 is controlled by a stop 49, the end of the rod 27 being provided with an offset pin 50 which engages between the bifurcated portions of a forked lever 51 pivotally mounted on the box 1, which lever is adapted to engage with the stop 49 to limit the upward movement of the rod 27. It may here be noted that the stop rod 27 is preferably provided with three teeth 46 although two are sufficient, and if the movement of the piston 30 is not sufficient to bring the end of the extension rod 26 out of engagement with the fan 22, the first tooth 46' will engage with the latch 45 and the spring 48 will then move both levers 27 and 44 downwardly a sufficient distance to open the valve 43. This feature of the invention is an important one for if for any reason the pressure created by pressing the bulb 40 should be sufficient to actuate the shutter mechanism, but not to raise the piston 30 a sufficient distance to release the fan 22, the valve 43 will nevertheless be opened and will therefore prevent a further actuation of the shutter mechanism, even if the bulb 40 should again be pressed, until the rods 27 and 44 have been released from engagement with each other. This construction will therefore prevent any possibility of a double exposure of a portion of the film. In order to lift the rod 27, should it be engaged by the tooth 46' a manually operable lever 52 is provided, which is pivotally mounted on the casing the inner end of which is adapted to engage with a lug 52'' carried by the rod 27, while the outer end of the lever extends exteriorly of the casing and is provided with a finger portion. When this finger portion is depressed the stop rod 27 is raised a sufficient distance to release the vane or fan 22 from the end of the rod 26 whereby the motor may act to shift the film.

Referring now to the mechanism which automatically releases the rod 27 from its engagement with the valve rod 44 to again permit it to be forced into engagement with the fan 22 by the tension of the spring 47, this mechanism is controlled by the length of the film unwound from the supply spool 4 in the following manner:—Rollers 53 and 54 whose axes are parallel to the roller 4 are arranged adjacent to the spool 4, the rollers 53 and 54 being out of alinement with the plane of a film 55 which passes underneath the roller 53 and over the roller 54, the film then passing over an idle roller 56' to the receiving spool 5. The rollers 53 and 54 are preferably covered with rubber or some other material which together with the bend in the film will, while the film is being wound on the spool 5, prevent the same from slipping over these rollers. However, the bend in the film is not sufficiently abrupt to prevent the film from slipping over the rollers when the rollers are locked in position as will be later referred to. The rollers 53 and 54 are geared together by means of pinions 56 and 57 respectively, the shaft of the pinion 57 carrying a pinion 57' which meshes with a gear wheel 58, the ratio of the gears 57' and 58 being such, that for one complete revolution of the gear 58, the length of film necessary for a new exposure will have passed over the roller 54 and it is for this reason that the rollers 53 and 54 are preferably coated with rubber to prevent the film from slipping when passing over them. The gear wheel 58 carries a pin 59 which is adapted to engage with an offset lug 60 carried by the rod 27. The normal position of the pin 59 and lug 60 with respect to each other is shown in Fig. 2, but when the piston 30 moves the rod 27 upwardly into engagement with the latch 45, the lug 60 is moved into the path of the pin 59 and as the exposed film is being wound on the spool 5, the gear wheel 58 will be rotated counter-clockwise until the pin 59 has completed one revolution and presses against the lug 60 to move the rod 27 out of engagement with the rod 44. The forked lever 51 has a projecting lug 62 which engages with the teeth of the pinion 56 to hold the rollers 53 and 54 and the gear wheel 58 against rotation, except when the motor operated mechanism is shifting the film; i. e. when the stop rod 27 has moved the forked lever 51 to the position shown in Fig. 4.

The operation of the camera is as follows: Assuming that the parts are in their normal positions as is shown in Figs. 2 and 3, and a fresh film roll carried by the supply spool 4 is inserted into the camera. The strip of paper fastened to the end of the film is inserted beneath the roller 53 and over roller 54 and the end of the strip pulled forwardly and fastened to the empty receiving spool 5, the strip slipping over the rollers 53 and 54, which are locked against rotation by the lug 62 carried by forked lever 51. The receiving spool 5 is then manually rotated by means of the key 13, until a portion of the film is brought into position for the first exposure, as is usual with the ordinary form of camera. If the bulb 40 is pressed and released, the piston 36 will be moved to actuate the shutter and when the port 37 is in communication with the nipple 38, the fluid pressure will be permitted to pass to the cylinder 31 to operate the piston 30. The stop rod 27 will then be moved upwardly which will move the rod 44 laterally due to the engagement of the teeth 46 with the latch 45. If the rod 44 were not permitted to have a slight lateral movement, the rod 27 would be moved laterally due to the engagement of the teeth 46 with the latch 45. The backside of the lug 60 would therefore press against the pin 59 as it is forced upwardly by the piston 30, because the pin 59 in its normal position is just out of vertical alinement with the lug, which pin would not have moved a sufficient distance to clear the lug 60 as the motion of the gear wheel 58 is relatively slow. The additional rotation given to the gear wheel 58 would therefore result in a slight inaccuracy in the measurement of the correct amount of film for the next exposure. Under the ordinary conditions of operation the movement of the rod 27 will be sufficient to permit the last tooth 46″ to engage with the latch 45 carried by the valve rod 44, the tension of the spring 47 locking these rods together. The upward movement of the rod 27 carries the forked lever 51 against the stop 49, the lug 62 being carried out of engagement with the pinion 56, so that the rollers 53 and 54 may rotate. The end of the extension rod 26 also vane 22. The motor operated mechanism through the spring barrel 14, gearing 16, 17, 19, 20, ratchet wheel 23 and pawl 25 will then rotate the receiving spool 5 to automatically wind up thereon, the portion of the film which has been exposed. In this position of the rods 27 and 44, the tension of the spring 47 merely holds the two rods locked together, while the tension of the spring 48 will draw both rods downwardly a sufficient distance to permit the ball valve 43 to open (see Fig. 4), the downward movement of the rods being limited by the stop 48. Should an attempt be made to take a second exposure while the motor operated mechanism is shifting the film this attempt will fail, since the valve 42 is interposed in the duct leading to the cylinder of the piston for operating the shutter and any pressure created by pressing the bulb 40 will be exhausted before reaching the cylinder 35.

As the film is being automatically wound, the rollers 53 and 54 will be positively rotated and the gear wheel 58 through the instrumentality of the pinion 57′, will be rotated in a counter-clockwise direction. The pin 59 carried by the gear wheel 58 will then make a complete revolution and since the rod 27 has been locked in its upper position, the offset lug 60 will be in the path of this pin. Just prior to the completion of the complete revolution of the pin 59, this pin will engage with the lug 60 and move the stop rod 27 laterally out of engagement with the latch 45. The tension of the spring 47 will then be exerted to move the rod 27 downwardly and inwardly and the rod 44 upwardly; i. e., to their original positions with the offset portion 32 of the rod 27 resting upon the end of the piston 30 and the ball valve 43 resting on its seat to close the valve. The end of the rod 26 upon the downward movement of the stop rod 27 is again brought into engagement with the vane or fan 22, which will stop the rotation of the motor operated mechanism and the fork lever 51 is at the same time moved downwardly to bring the lug 62 into engagement with the gear 56 to prevent further rotation of the rollers 53 and 54. The parts are therefore in their normal position and to obtain a second exposure, it is only necessary to press the bulb 40. To insure the proper engagement of the rod 26 with the fan 22, it is necessary to have these parts overlap each other for a considerable distance and in the practical construction of a camera, this distance would be approximately one-fourth or three-sixteenths of an inch. If such a construction were not used the blades of the fan might become bent by the end of the rod 26 striking the edge of the blade which might easily occur if one of the blades was in alinement with the rod 26, when it is moved suddenly downward by the spring 47. In order to prevent a second actuation of the shutter mechanism if the rod 27 should not be moved sufficiently to permit the free rotation of the fan 22, the first tooth 46′ is provided, which when the latch 45 is engaged thereby, the rod 44 will be moved downward sufficiently to open the valve 42 and thus prevent a further actuation of the shutter. The exposed film, however, will still remain opposite the shutter and in order to automatically shift the same, the finger portion of the lever 52 is depressed and the engagement of this lever with the lug 52′ will move the rod 27 upwardly a sufficient distance so that the same will engage with the tooth 46″ as in the normal operation of the camera. The motor operated mechanism will then shift the film in the manner which has been described.

I claim:—

1. In a camera, a shutter, mechanism for advancing the film, fluid pressure operated pistons and connections for the same for actuating the shutter and for controlling the mechanism for advancing the film, and a normally closed valve disposed in the connections to the piston for actuating the shutter and means controlled by the mechanism for advancing the film to open said valve to prevent a second actuation of the shutter until the mechanism has been operated.

2. In a camera, a shutter, motor operated mechanism for advancing the film, means including two fluid pressure operated pistons for respectively actuating the shutter and controlling the starting of the motor, a roller over which the film passes, and means associated with said roller for controlling the stopping of the motor.

3. In a camera, a shutter, motor operated mechanism for advancing the film, means including two fluid pressure operated pistons for respectively actuating the shutter and controlling the starting of the motor, and means for preventing a second operation of the piston for actuating the shutter until the motor operated mechanism has advanced the film.

4. In a camera, a shutter, motor operated mechanism for advancing the film, fluid pressure operated pistons and connections for the same for successively actuating the shutter and controlling said mechanism, and means interposed in said connections for opening the same after the actuating of the shutter and maintaining said connections open until the motor operated mechanism has advanced the film.

5. In a camera, a motor operated mechanism for advancing the film, a movable member for controlling the starting and stopping of the motor, manually operable means for moving said member to permit said motor to start, and means including two rotatable rollers between which the film passes for controlling the movement of said member to stop the motor when a determined length of film has passed between said rollers, said rollers being arranged to bend the film as it passes therebetween.

6. In a camera, a shutter, motor operated mechanism for advancing the film, a movable member for controlling the starting and stopping of the motor, fluid pressure means for successively actuating the shutter and moving said member to permit the motor to start, a normally closed valve located in said fluid pressure means and a member associated with said first named movable member for controlling said valve.

7. In a camera, a shutter, motor operated mechanism for advancing the film, a movable member controlling the starting and stopping of said motor, means including two fluid pressure operated pistons for actuating said shutter and moving said member to control the starting of the motor, means for locking said member in a position permitting the operation of the motor, a roller over which said film passes and means associated with said roller to move said member to control the stopping of the motor.

8. In a camera, a motor operated mechanism for advancing the film, a movable member for controlling the starting and stopping of the motor, means for normally maintaining said member in motor stopping position, manually operable means to move said member to control the starting of said motor, a latch for maintaining said member in its moved position, a roller over which the film passes, and means controlled by the passage of a predetermined length of film over said roller for releasing said member from said latch whereby said member automatically moves to its motor stopping position.

9. In a camera, a motor operated mechanism for advancing the film, a movable member for controlling the starting and stopping of the motor, means for normally maintaining said member in motor stopping position, manually operable means to move said member to control the starting of said motor, a latch for maintaining said member in its moved position, a roller over which the film passes, means controlled by the passage of a predetermined length of film over said roller for releasing said member from said latch whereby said member automatically moves to its motor stopping position, and means for maintaining said roller locked against rotation when said member is in its motor stopping position.

10. In a camera, a shutter, a motor operated mechanism for advancing the film, a movable member for controlling the starting and stopping of said member, means normally urging said member to motor stopping position, manually operable means for successively actuating said shutter and for moving said member to control the starting of the motor, a second movable member, means for locking said members together in a plurality of different positions upon movement of said first named member, said first named member permitting the operation of the motor in one of its locked positions and preventing it in another, a spring for moving said members when locked together, and means controlled by said second named member for preventing a second actuation of the shutter until the first named member has been disengaged from said second named member.

11. In a camera, a shutter, a motor operated mechanism for advancing the film, a movable member for controlling the starting and stopping of said member, means normally urging said member to motor stopping position, manually operable means for successively actuating said shutter and for moving said member to control the starting of the motor, a second movable member, means for locking said members together in a plurality of different positions upon movement of said first named member, said first named member permitting the operation of the motor in one of its locked positions and preventing it in another, a spring for moving said members when locked together, means controlled by said second named member for preventing a second actuation of the shutter until the first named member has been disengaged from said second named member, and means controlled by a predetermined length of film passing over a roller for disengaging said members when said first named member is in a position to permit the operation of the motor.

12. In a camera, a shutter, a motor operated mechanism for advancing the film, a movable member for controlling the starting and stopping of said member, means normally urging said member to motor stopping position, manually operable means for successively actuating said shutter and for moving said member to control the starting of the motor, a second movable member, means for locking said members together in a plurality of different positions upon movement of said first named member, said first named member permitting the operation of the motor in one of its locked positions and preventing it in another, a spring for moving said members when locked together, means controlled by said second named member for preventing a second actuation of the shutter until the first named member has been disengaged from said second named member, means controlled by a predetermined length of film passing over a roller for disengaging said members when said first named member is in a position to permit the operation of the motor, and manually operable means for moving said first named member to its motor starting position.

13. In a camera, a shutter, a motor operated mechanism for advancing the film, a movable member for controlling the starting and stopping of the motor, means for normally maintaining said member in motor stopping position, two fluid pressure operated pistons and connections for the same for successively actuating the shutter and moving said member to permit the motor to start, a latch for holding said member in its moved position, a valve in said connections, and means associated with said latch for maintaining said valve open while said movable member is engaged with said latch.

14. In a camera, a shutter, a motor operated mechanism for advancing the film, a movable member for controlling the starting and stopping of the motor, fluid pressure operated pistons and connections for the same for actuating the shutter and moving said member to control the starting of the motor, respectively, and manually operable means for moving said member to motor starting position independently of the fluid pressure.

15. In a camera, a shutter, motor operated mechanism for advancing the film, two members, one for operating the shutter the other for controlling the motor, means for successively actuating said members, a roller over which said film passes and means associated with said roller for controlling the stopping of the motor.

16. In a camera, a shutter, motor operated mechanism advancing the film, separate members for actuating the shutter and for controlling the operation of the motor, respectively, and means for preventing the second operation of the member actuating the shutter until the motor operated mechanism has advanced the film.

17. In combination, a camera adapted to contain a roll of sensitized material and having shutter operating means, a motor and means operated thereby for shifting said sensitized material, means for automatically controlling the operation of the motor to shift the film after each exposure, and manually operable means for controlling the motor at will independently of the automatic control.

In witness whereof, I subscribe my signature, in the presence of two witnesses.

JOHN N. JOHNSON.

Witnesses:
M. E. HICKEY,
J. J. LUKENS.